July 19, 1927.
W. T. HOOFNAGLE
1,636,132
COTTON PICKING MACHINE
Filed July 14, 1925
2 Sheets-Sheet 1
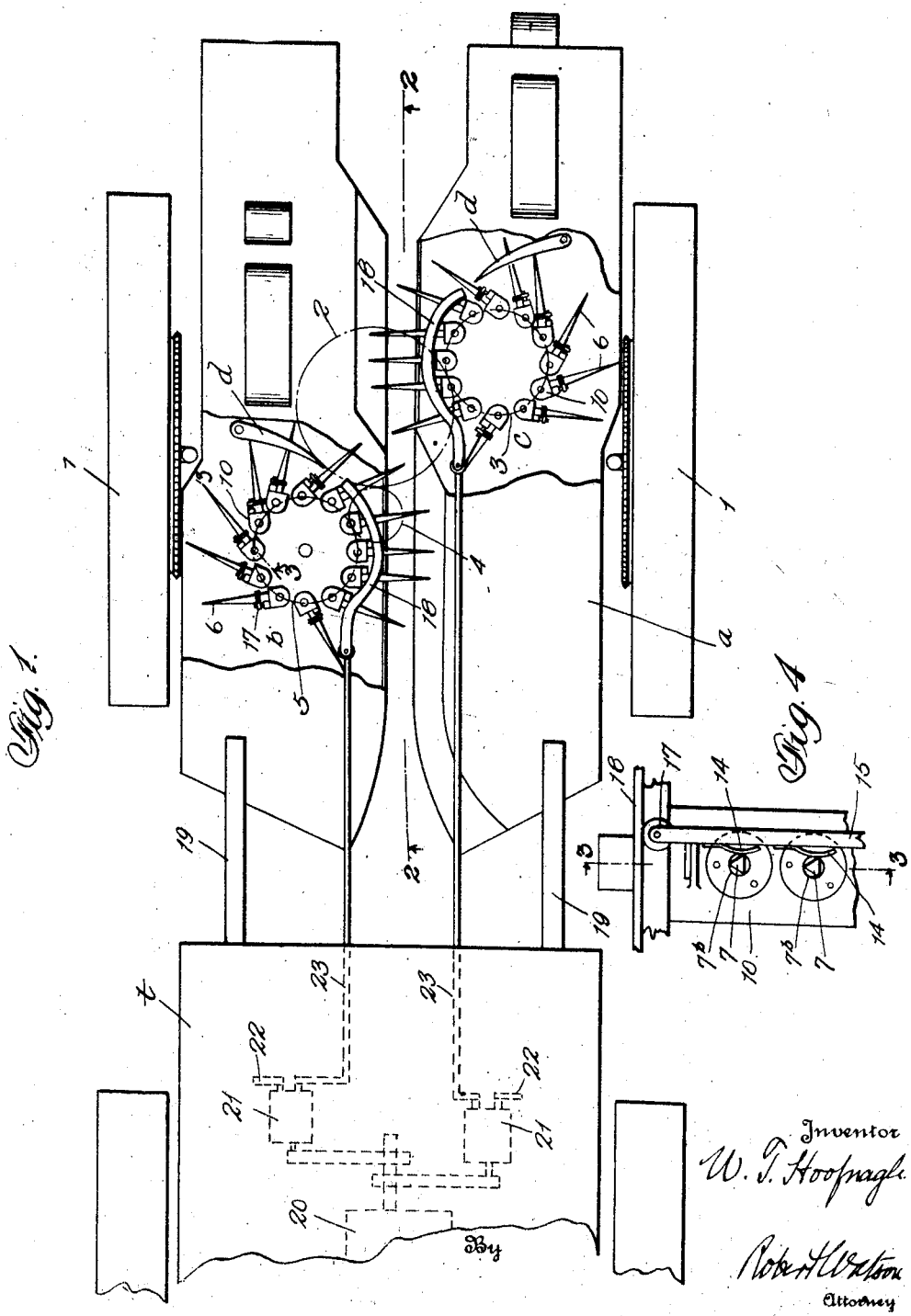

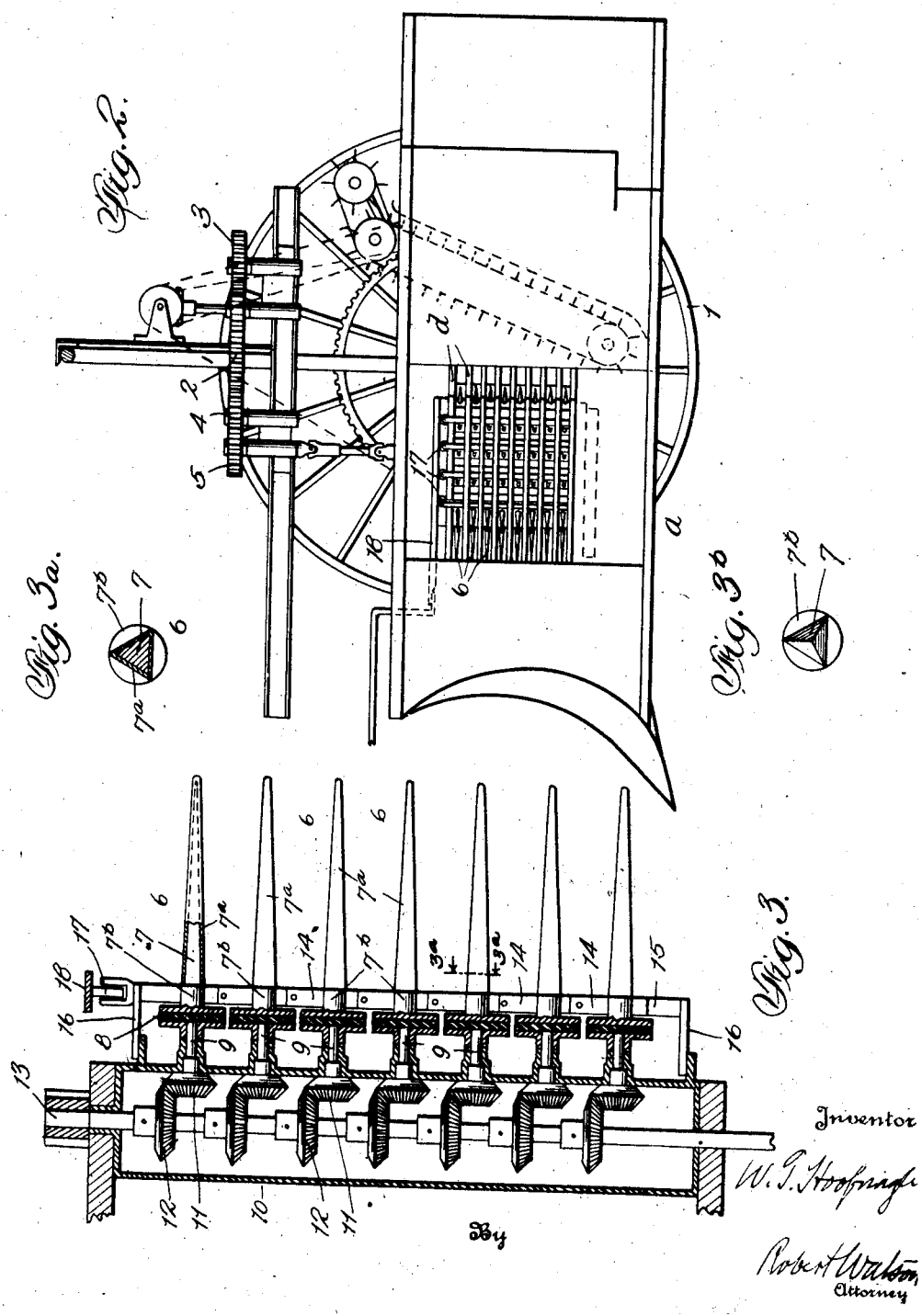

Patented July 19, 1927.

1,636,132

UNITED STATES PATENT OFFICE.

WILLIAM T. HOOFNAGLE, OF GLEN RIDGE, NEW JERSEY.

COTTON-PICKING MACHINE.

Application filed July 14, 1925. Serial No. 43,505.

This invention relates to improvements in cotton picking machines, and more particularly to the picking fingers. The picking fingers in machines of this class consist of rods which are rotated as the machine moves along the rows of cotton plants, and the fingers, by suitable mechanical means, are caused to enter the cotton plants to engage the bolls and extract the cotton, and are then withdrawn and passed between suitable strippers to strip the cotton fibers from the fingers. Usually these fingers are roughened so as to pick the fibers and cause the cotton to wrap around them; but these roughened surfaces interfere with stripping the cotton from the fingers.

It is the purpose of my invention to provide fingers with smooth surfaces so that the cotton fibers may be readily stripped from the fingers. To accomplish this, I provide fingers consisting of metal rods each having a smooth outer covering or coating of dielectric material, and I provide means for applying an electro-static charge to this outer covering while the fingers are in the cotton, whereby when the fingers are brought into contact with the cotton fibers in the bolls, the fibers will be attracted and held to the fingers, and as the latter rotate, the cotton will be withdrawn from the bolls and wrapped around the fingers, from which it may be readily stripped. Preferably, the fingers are angular in cross section so that after some of the fibers have adhered to a finger, and the latter has made one or more revolutions, the adhering fibers will be bent around the sharp angles of the finger and the remaining fibers will be mechanically pulled from the boll.

The picking fingers of my invention may be applied to any suitable form of cotton picking machine. In the drawings, I have illustrated only so much of the machine as is necessary to illustrate the invention.

In the accompanying drawing,

Fig. 1 is a plan view showing, in outline, a cotton picking machine and tractor for pulling the same with the means for applying electrostatic charges to the coatings or coverings on the fingers;

Fig. 2 is a section on the line 2—2 of Fig. 1;

Fig. 3 is a longitudinal section through one of the gear casings carrying a row of picking fingers on the line 3—3 of Fig. 1, and of Fig. 4, one of the fingers being shown partly in section, and the contact bar for the row of fingers being also shown;

Fig. 3ª is a cross section through one of the picking fingers, about on the line 3ª—3ª of Fig. 3;

Fig. 3ᵇ is an end view of a picker; and,

Fig. 4 is a side elevation of a part of the casing shown in Fig. 3, looking from right to left, and showing two of the picking fingers and the contact members.

Referring to the drawing, $a$ represents a cotton picking machine mounted on the wheels 1 and having two groups, $b$ and $c$, of cotton picking fingers, these groups being driven in opposite directions by suitable gearing from one of the wheels 1, this gearing including a main gear 2, meshing with a gear 3 for rotating the group of pickers $c$, and also meshing with a gear 4, which drives the group $b$ through a gear 5. The gearing arrangement shown is substantially the same as that illustrated in patent to Scherling, No. 952,688, dated March 22, 1910, cotton harvester. The picking fingers 6 in the groups $b$ and $c$ are all alike and are mounted and operated so that as the machine is drawn along the ground, with the wheels 1 straddling the rows, the fingers in the group $b$ will enter the rows of plants from one side of the row and the group $c$ will enter the plants from the other side of the row, and as the groups rotate, the cotton will be stripped from the pickers by stripping bars $d$, which extend between the pickers in the vertical rows.

As shown in Fig. 3, each picker comprises a tapering metal rod 7, which is preferably angular in cross section, and to the outer side of this rod is applied a coating or covering of dielectric material 7ª, which may be celluloid, or any other suitable dielectric substance. Each rod 7 is connected by an insulating joint 8 to a short shaft 9, having a bearing in the casing 10, and upon the shaft, within the casing, is arranged a beveled gear 11, which meshes with a beveled gear 12, upon a vertically arranged drive shaft 13. The part 7ᵇ of the picking finger, adjacent the insulating joint, is not covered with the dielectric material, and forms a contact surface which is engaged by a spring 14 on a vertical conducting bar 15, which is secured by insulating supports 16 to the casing 10. This conducting bar is arranged close to a vertical row of picking fingers and has a contact spring 14 for each picker in the row, so that all of the metal rods in the picking fingers will be electrically connected to the conducting bar 15.

The outer surfaces of the picking fingers are smooth, so that the cotton fibers may be readily stripped from the fingers, but the fingers are preferably angular in cross section, as shown in Fig. 3ª.

It will be understood that each vertically arranged gear casing 10 carries a row of the picking fingers, and on each casing is mounted one of the conducting rods 15. The upper end of each conducting rod carries a roller 17 which, when the pickers are in the plants, bears against the underside of an arcuate conducting bar 18, which extends part way around the group of picker casings. As shown, there are two of these arcuate conducting bars, one for each of the groups, and they are arranged so that they will be engaged by the rollers 17 only while the vertical rows of pickers are extended into the cotton plants. Thus, as shown in the drawing, the rolls on only five of the vertical rows of each group engage the arcuate conductors.

A tractor t is shown as a means for propelling the cotton picking machine, and the tractor is connected to the machine by suitable metal draw bars 19. These draw bars also provide electrical connections between the frames of the tractor and picking machine. Upon the tractor is a constantly operating driving motor 20, and two small current generators 21 are suitably driven from this motor. One pole of each generator is grounded, as shown at 22, and the other pole is connected by a flexible conductor 23 to one of the arcuate conducting bars 18. These generators are of high voltage and of relatively small current capacity, the functions of the generators being to apply electrostatic charges to the outer coatings of the pickers while the latter are in the cotton plants. Any type of generator suitable for this purpose may be employed.

In operation, as the cotton picking machine is moved along the rows of cotton plants by the tractor, the generators are driven and a high voltage current is applied to the several pickers in each vertical row of pickers as they come under the arcuate bars 18, the current from said bars flowing through the rollers 17 to the vertical conducting rods 15, and thence passing through the springs 14 to the contact surfaces 7ᵇ on the picker rods. With a suitable high voltage current applied to the metal rods 7, electrostatic charges will be induced on the outer surfaces of the dielectric coatings on these rods and these electrostatic charges will cause the cotton fibers to adhere to the picking fingers. As previously stated, the picking fingers are preferably angular in cross section and as the fibers which adhere to the fingers are carried around by the rapid rotation of the fingers, the fibers wrap around the sharp angles of the fingers and are mechanically pulled from the bolls. When the rollers on the vertical conducting bars pass from under the arcuate conductors 18, the electrical connection between the generators and the pickers is broken and the pickers pass between the strippers which remove the cotton from the pickers. The cotton strips readily from the fingers as the surfaces of the fingers are smooth and the electrostatic charge, if any remains on the pickers, has not sufficient attractive force to interfere with stripping the fibers from the tapering fingers. This charge rapidly dissipates after the interruption of the current.

What I claim is:

1. In a cotton picking machine, a plurality of picking fingers each comprising a metal rod insulated from the machine, and means for connecting said rods to a current source.

2. In a cotton picking machine, a plurality of picking fingers, each comprising a metal rod insulated from the machine and having a covering of dielectric material.

3. In a cotton picking machine, a plurality of picking fingers, each having a covering of dielectric material, and means for applying an electrostatic charge to said covering.

4. In a cotton picking machine, a plurality of picking fingers, each comprising a metal rod insulated from the machine and having a covering of dielectric material, means for rotating said fingers and for inserting and withdrawing the same from the cotton plants, and means for connecting said fingers to a current source while in the plants.

5. In a cotton picking machine, a plurality of picking fingers, each comprising a metal rod insulated from the machine and having a covering of dielectric material, means for rotating said fingers and for inserting and withdrawing the same from the cotton plants, and means for connecting said fingers to a current source while in the plants and for disconnecting the fingers from said source after they have been withdrawn from the plants.

6. In a cotton picking machine, a plurality of picking fingers, each comprising a metal rod insulated from the machine, means for rotating said fingers and for inserting and withdrawing the same from the cotton plants, and means for connecting said fingers to a current source while in the plants.

In testimony whereof I hereunto affix my signature.

WILLIAM T. HOOFNAGLE.